United States Patent
Vogt

(10) Patent No.: US 8,123,427 B2
(45) Date of Patent: Feb. 28, 2012

(54) MOUNTING FOR AN OPTICAL APPARATUS

(76) Inventor: Philippe Vogt, Besancon (FR)

(*) Notice: Subject to any disclaimer, the term of this patent is extended or adjusted under 35 U.S.C. 154(b) by 701 days.

(21) Appl. No.: 11/603,595

(22) Filed: Nov. 22, 2006

(65) Prior Publication Data
US 2007/0151387 A1    Jul. 5, 2007

(30) Foreign Application Priority Data
Nov. 22, 2005   (EP) .................................. 05405652

(51) Int. Cl.
*F16C 11/06*    (2006.01)
(52) U.S. Cl. ........................................ 403/90; 403/137
(58) Field of Classification Search .............. 403/56, 403/83, 84, 90, 123, 137; 248/288.31, 288.51, 248/278.1; 74/25; 269/71–73; 285/184, 285/261, 912
See application file for complete search history.

(56) References Cited

U.S. PATENT DOCUMENTS
1,894,456 A * 1/1933 Zerk
(Continued)

FOREIGN PATENT DOCUMENTS
DE           308586      * 5/1932
(Continued)

*Primary Examiner* — Victor MacArthur
(74) *Attorney, Agent, or Firm* — Jordan and Hamburg LLP

(57) ABSTRACT

A mounting for an optical apparatus includes a joint ball (1), a mounting device (2) for the optical apparatus and means for fixing the mounting device to the joint ball (1). The mounting device has two rings (6, 7) which are arranged displaceable to one another and are also movable on the joint ball (1) and surround the joint ball. A fixing means (3) is disposed between the rings (6, 7) and connects them, the whole such that the rings can be moved simultaneously and jointly.

11 Claims, 5 Drawing Sheets

U.S. PATENT DOCUMENTS

| | | | | |
|---|---|---|---|---|
| 2,151,833 A | * | 3/1939 | Bugatti | 285/912 |
| 2,283,974 A | * | 5/1942 | Dillon | 285/912 |
| 2,378,912 A | * | 6/1945 | Collins | 269/71 |
| 2,518,592 A | * | 8/1950 | Bell | 248/288.31 |
| 2,670,228 A | * | 2/1954 | Pagliuso | 403/137 |
| 3,211,405 A | * | 10/1965 | Fey et al. | 403/90 |
| 3,958,904 A | * | 5/1976 | Rusbach | 403/90 |
| 4,040,650 A | * | 8/1977 | Shotbolt | 285/912 |
| 4,423,850 A | * | 1/1984 | Bass | 248/288.51 |
| 4,690,365 A | * | 9/1987 | Miller et al. | |
| 4,886,230 A | | 12/1989 | Jones et al. | |
| 4,974,802 A | * | 12/1990 | Hendren | 248/288.51 |
| 5,572,797 A | * | 11/1996 | Chase | |
| 5,590,870 A | | 1/1997 | Goellner et al. | |
| 5,782,572 A | * | 7/1998 | Thiem | 403/90 |
| 5,871,186 A | | 2/1999 | Bothe et al. | |
| 6,017,010 A | * | 1/2000 | Cui | 248/288.31 |
| 7,343,841 B2 | * | 3/2008 | Phillips et al. | |

FOREIGN PATENT DOCUMENTS

| | | |
|---|---|---|
| DE | 20205827 | 8/2003 |
| EP | 0829675 | 3/1998 |
| FR | 1310611 | 11/1962 |
| JP | 7-319062 | 12/1995 |

* cited by examiner

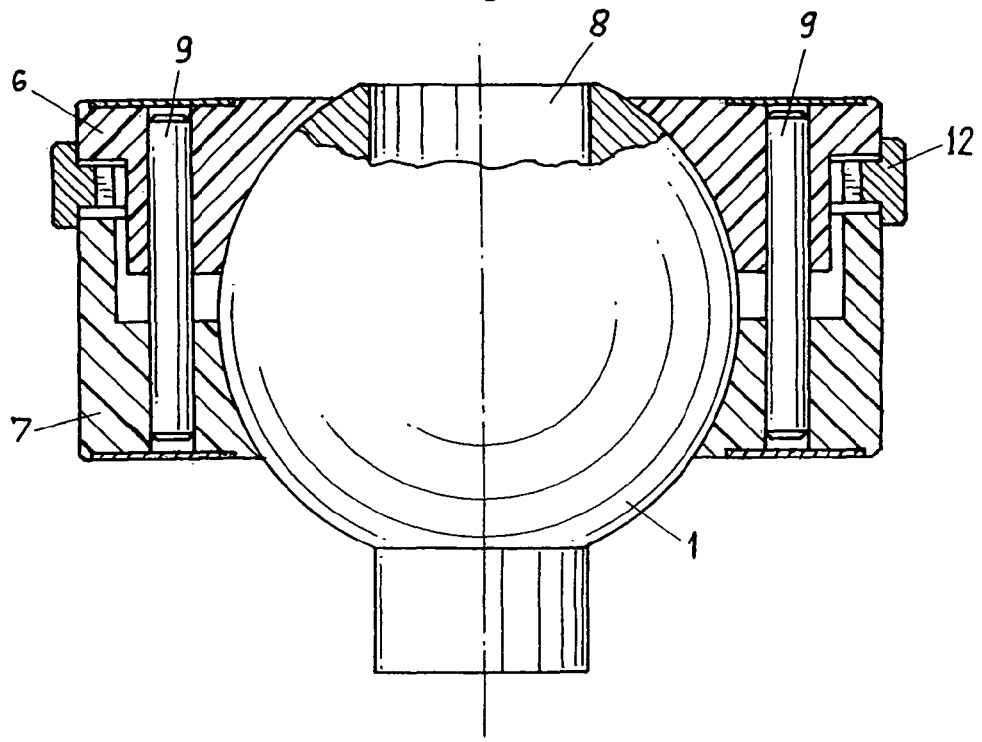
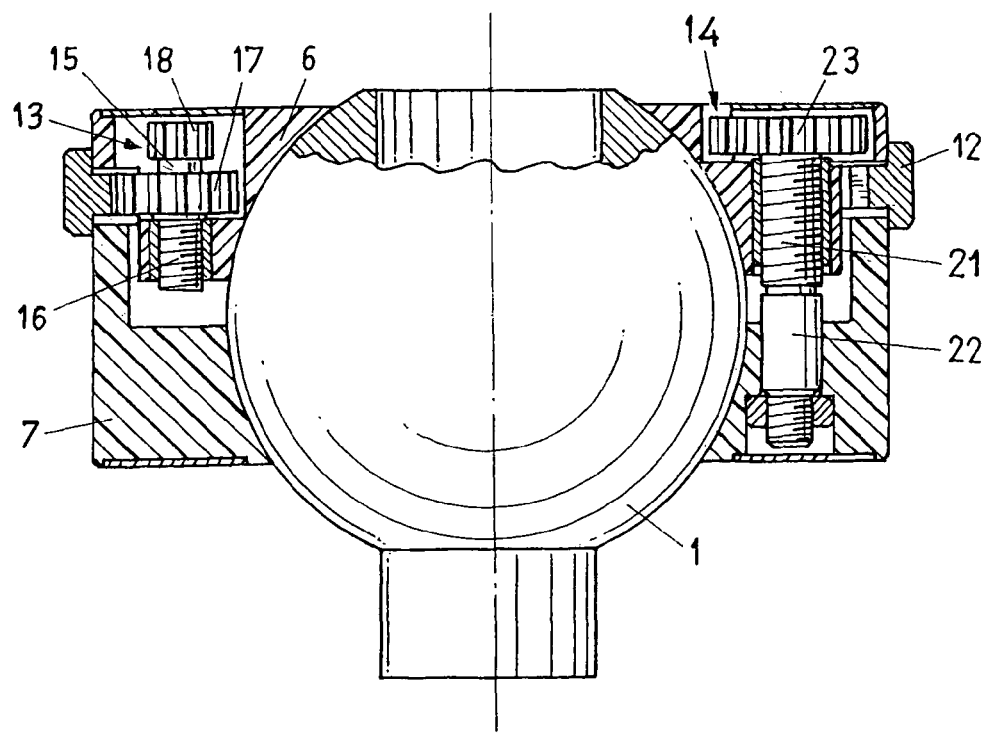

MOUNTING FOR AN OPTICAL APPARATUS

BACKGROUND OF THE INVENTION

The invention relates to a mounting for an optical apparatus including a joint ball, a mounting device for the apparatus and means for fixing the mounting device at the joint ball.

A mounting of this kind is known from EP 0 829 675. The mounting contains a fixed joint ball, a bridge with a width which is smaller than the ball diameter and which engages around the half diameter of the ball and a handle with a screw and a knurled bolt for the fixing and for locking the bridge on the joint ball.

The disadvantages of the known mounting are to be seen in the fact that the contact surface between the joint ball and the bridge is limited, that the fixing force in the direction of the bolt axis is only partially applied to the joint ball and that the joint ball has a larger diameter in order to achieve an adequate holding force, whereby the weight of the mounting is considerable and the use is restricted.

It is the object of the invention to improve a mounting of the initially named kind in this respect.

SUMMARY OF THE INVENTION

The mounting formed in accordance with the invention includes, in comparison to the known mounting, a mounting device with two rings which are displaceable relative to one another and also movably arranged on the joint ball and which surround the joint ball and a fixing means which is arranged between the rings and connects them, the whole such that the rings can be moved simultaneously and jointly.

Through the solution in accordance with the invention radial holding forces are exerted over a large area on the joint ball by the mounting device. In this way, with a smaller joint ball, a compact mounting with reduced weight is provided which can be used in many applications.

Advantageous embodiments are described in the description, the claims and the drawings.

It is of advantage, when the joint ball and the rings consist of a material selected from the group comprising metal, plastic or laminated wood.

It is of advantage, when the joint ball is provided with a cut-out in order to reduce its weight.

In accordance with a first embodiment, the rings consist of plastic and are guided on guides and the means for the fixing of the rings has three clamping units which contain a first and a second gear drive and are arranged uniformly distributed on a circle in the rings as well as a toothed ring for rotating the gear drives. In this manner it is possible, with the aid of the gear drives, to apply a base friction or a holding force to the joint ball over the full area.

In accordance with a second embodiment, the means for fixing the rings has a clamping unit with a first and a second gear drive, a toothed ring for rotating the gear drives and two clamping elements. In this manner a simplified and cost-favourable mounting device can be achieved.

In accordance with a third embodiment, the means for the fixing of the rings is a hydraulic system which includes three pressure cylinders which are arranged between the rings and a control cylinder which communicates with the pressure cylinders via a ring line. In this manner a reliable fixing of the rings can be achieved.

In accordance with a fourth embodiment, the means for fixing the rings is a vacuum system which includes a ring chamber which is formed between the rings and a control cylinder which communicates with the ring chamber. In this manner a very sensitive fixing of the rings can be achieved.

It is of advantage when a holder is provided for the joint ball which has a pillow block bearing with an axle which can be connected to the joint ball and fixing means for the axle and the joint ball, the whole such that the joint ball can be rotated around the optical axis and pivoted with the axle and a flexible setting can be achieved.

BRIEF DESCRIPTION OF THE DRAWINGS

In the following the invention will be described purely by way of example with reference to a tripod head and to the accompanying drawings which show:

FIG. 3 a section along the line I-I in FIG. 2,

FIG. 4 a section along the line II-II in FIG. 2,

DETAILED DESCRIPTION OF THE INVENTION

Figure 1:
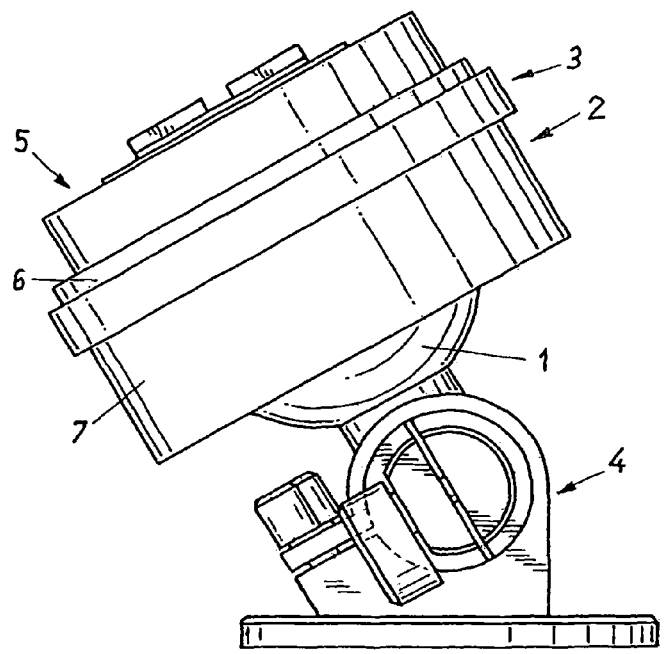
FIG. 1 a view of a tripod head.

As FIG. 1 shows the tripod head consists essentially of a joint ball 1, a mounting device 2 for a camera, a means 3 for fixing the mounting device 2 to the joint ball 1, a holder 4 for the joint ball 1 and a panorama device 5.

Reference is made for FIGS. 2 to 5 which show a first embodiment of the mounting device.

The mounting device 2 contains a first and a second ring 6 and 7 with a sliding surface matched to the contour of the joint ball 1 and three guide members 9 for the rings 6 and 7 which are arranged uniformly distributed on a circle. The joint ball 1 can consist of metal, plastic or laminated wood and is provided with a blind bore 8 and the rings can be selected from the group comprising metal, plastic or laminated wood in order to reduce the weight (FIG. 3).

The means 3 for fixing connects the rings 6 and 7 and includes three clamping units 11 which are arranged uniformly distributed on the circumference and a toothed ring 12 for actuating the clamping units 11. The clamping unit 11 includes a first gear drive 13 which meshes with the gear ring 12 and a second gear drive 14 which meshes with the first gear drive 13. The first gear drive 13 consists of an axle 15 with a threaded section 16 which is screwed into a threaded bore in the first ring 6, a first gear 17 with a higher number of teeth and a second gear 18 with a lower number of teeth which are secured above one another to the axle 15. The second gear drive 14 consists of an axle 21 with a threaded section which is screwed into the first ring 6, a cylindrical section 22 which is held in the second ring 7 and a gear 23 which is secured to the axle 21 (FIGS. 4 and 5).

Figure 2:
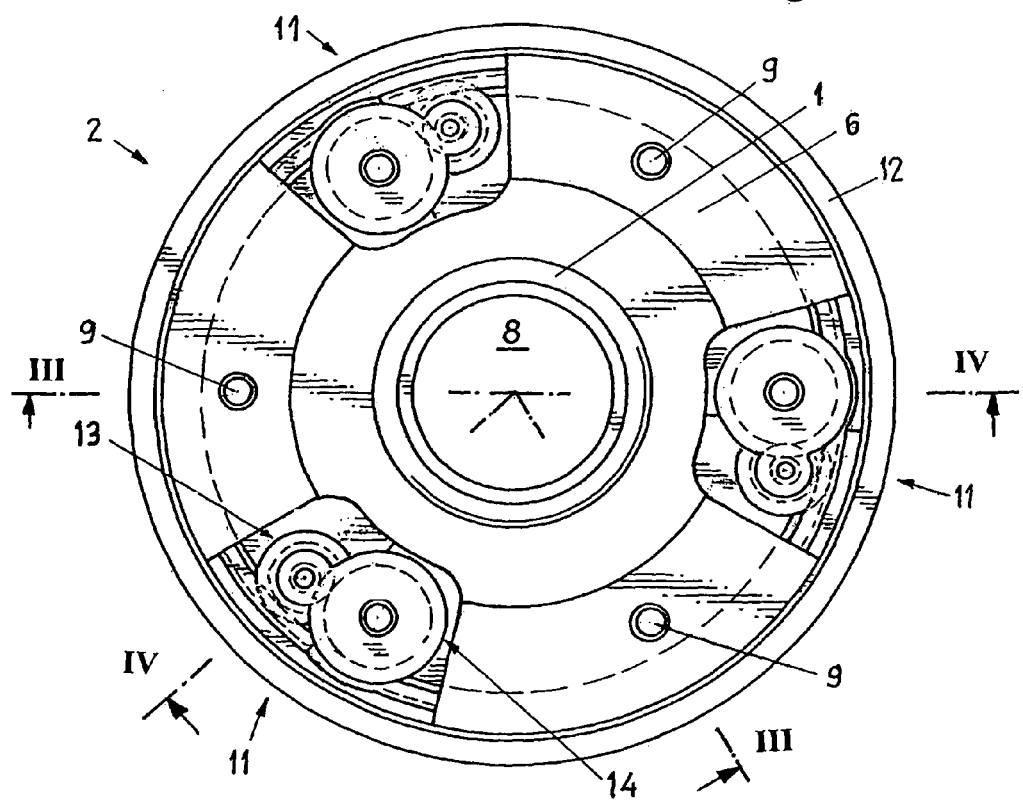
FIG. 2 a plan view of a first embodiment of a camera mounting device.
Figure 5:
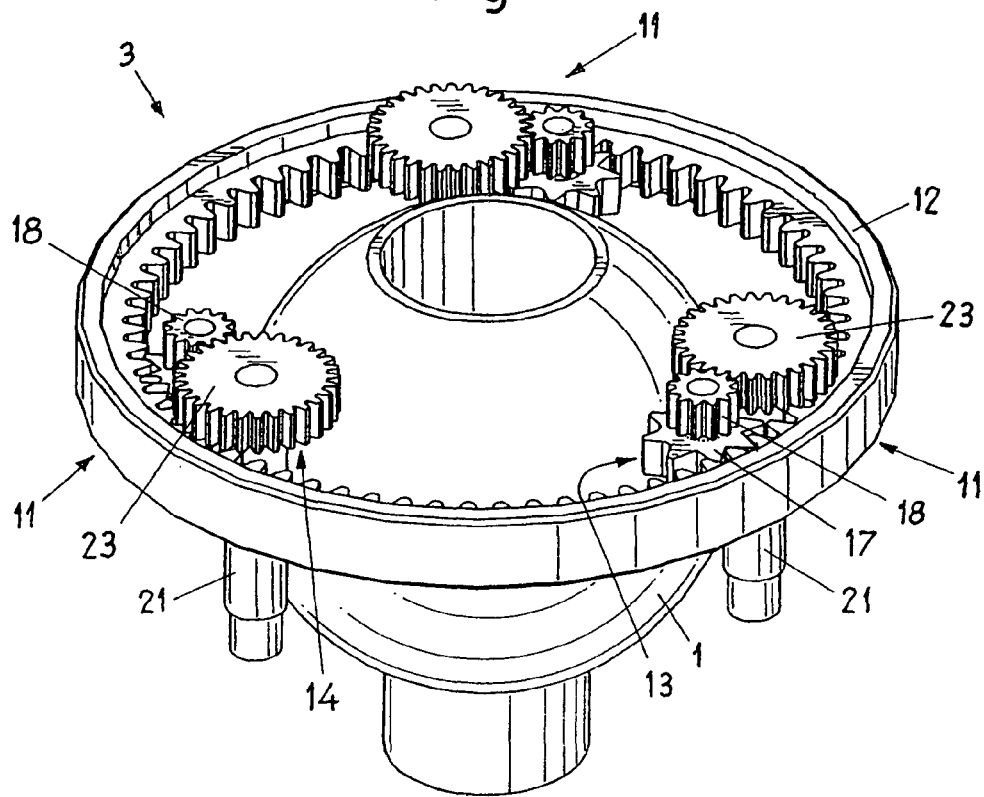
FIG. 5 a first embodiment of a means for fixing the camera mounting device in a perspective view, FIG. 6 a second embodiment of the camera mounting device in section, analogous to the section along II-II in FIG. 3, FIG. 7 a third embodiment of a camera mounting device, FIG. 8 a fourth embodiment of a camera mounting device, FIG. 9 a plan view analogous to FIG. 2 of a modified camera mounting device, FIG. 10 a first embodiment of a holder for the joint ball in a perspective illustration, FIG. 11 a second embodiment of a holder and FIG. 12 an embodiment of a panorama device in section.
Figure 6:
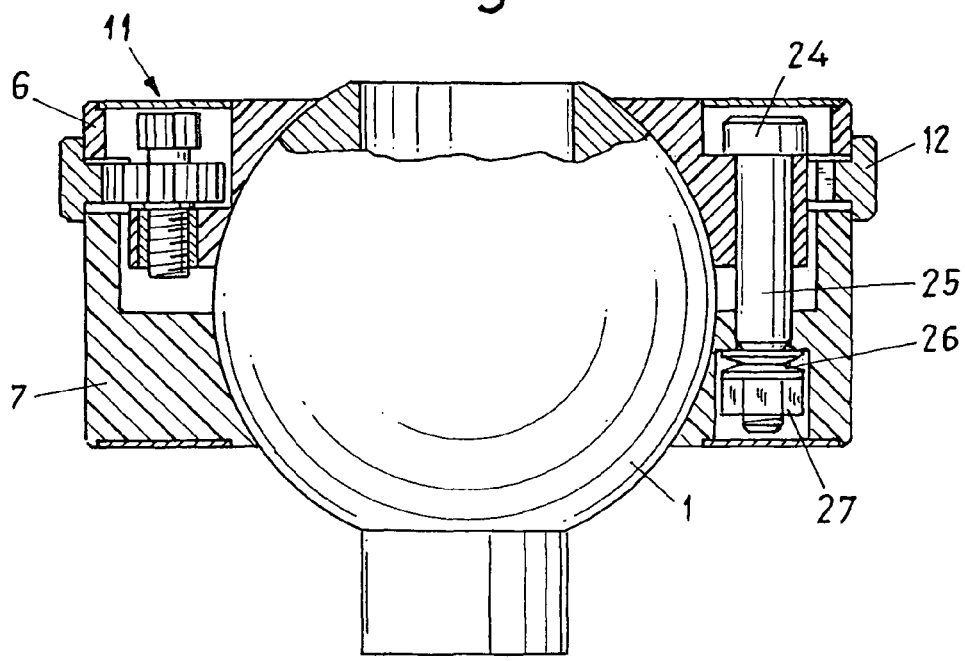

FIG. 6 shows a second embodiment which is distinguished from the embodiment of FIGS. 2 and 5 by the design of the means for fixing the rings As can be seen from FIG. 6, the fixing means 3 has a clamping unit 11 with a first and second gear wheel drive 13, 14 and two clamping elements 24. The clamping element contains a bar 25 which is arranged in the first and second rings, plate springs 26 which are arranged on the bar and a hexagonal nut 27.

Figure 7:
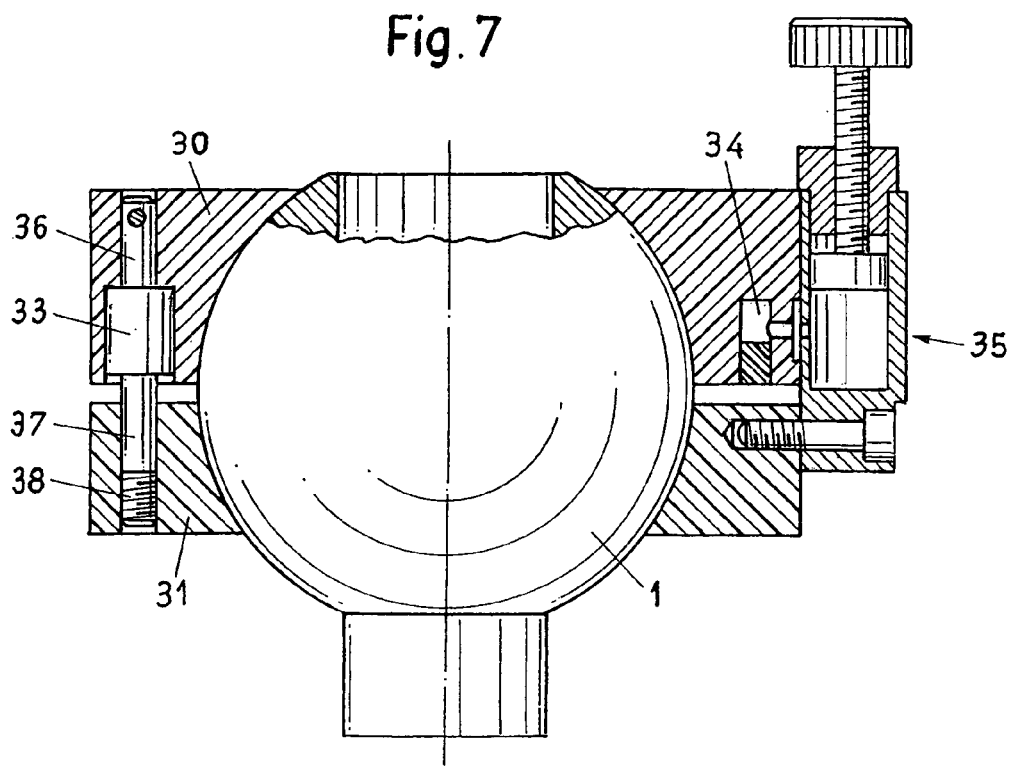

FIG. 7 shows a third embodiment which is distinguished from FIGS. 2 to 5 in that a hydraulic system is provided instead of the clamping units 11. The hydraulic system includes three pressure cylinders 33 known per se which are connected to one another by a ring line 34 and to a control cylinder 35 for the application of pressure. The pressure cylinder 33 contains a first piston 36 which is connected to the first ring 30 and a second pis-ton 37 for adjusting the displacement which is adjustably arranged in the second ring 31. For this purpose the fixed piston 37 has a threaded projection 38 with an internal hexagon.

Figure 8:
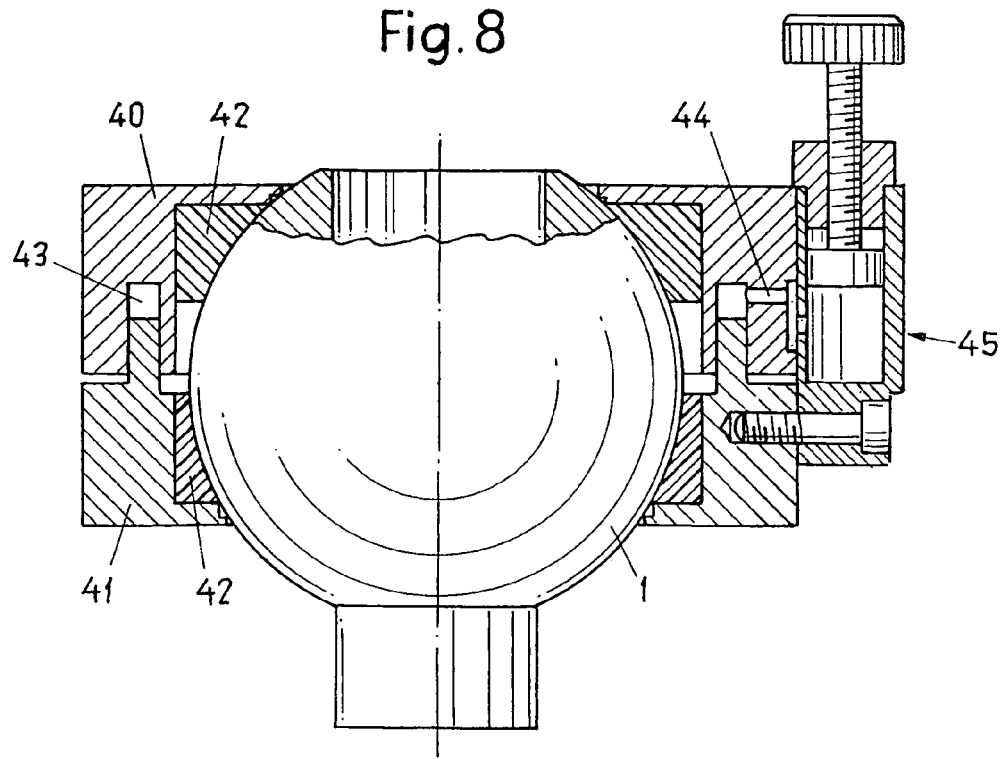

FIG. 8 shows a fourth embodiment of the mounting device which is distinguished from the embodiment of FIGS. 2 to 5 in that it has a first and a second ring 40, 41 of metal and two bearing rings 42 of plastic and that a vacuum system is provided instead of the clamping units 11. The vacuum system includes a ring chamber 43 which is formed between the first and the second ring 40, 41 and is connected via a connection passage 44 to a control cylinder 45 for the production of a vacuum.

Figure 9:
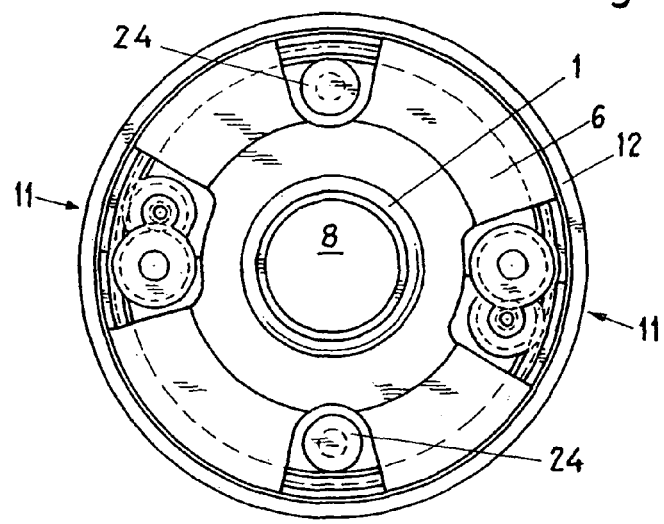

FIG. 9 shows a modified embodiment of the mounting device which is distinguished from the embodiment of FIG. 6 in that the fixing means 3 has two clamping units 11 and two clamping elements 24.

Figure 10:
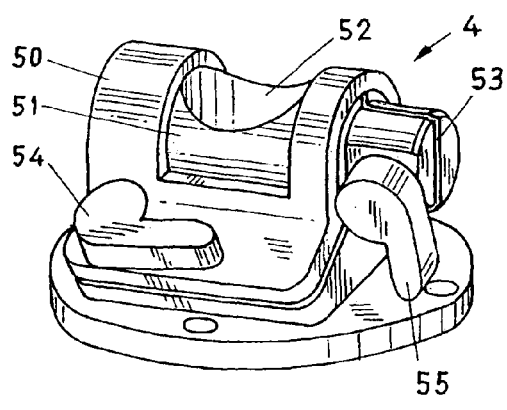

As FIG. 10 shows the holder 4 includes a pillow block bearing 50 and an axle 51. The pillow block bearing is slotted at one side. The axle 51 contains a through bore 52 which is arranged perpendicular to the axis of rotation and a slot 53 which extends from one end of the axle 51 up to the through hole 52. Furthermore, the holder 4 is provided with a lever 54 for fixing the axle in the pillow block bearing and a lever 55 in order to fix the joint ball in the axle.

Figure 11:
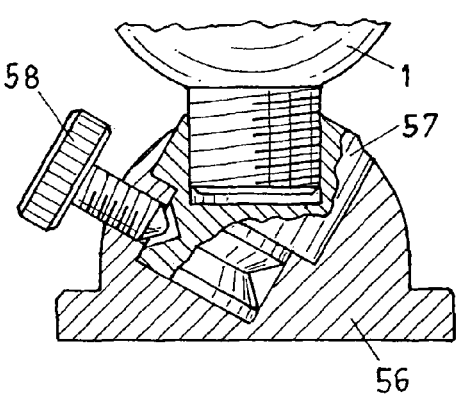

FIG. 11 shows a second embodiment of the holder. The holder has a carrier 56 with a blind bore which is arranged inclined with respect to the base of the holder, a connection part 57 with a threaded bore for the joint ball 1 which is rotatably arranged in the blind bore and a screw 58 for fixing the connection part.

Figure 12:
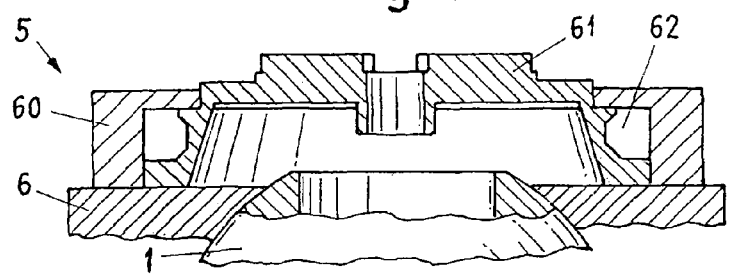

As FIG. 12 shows the panorama device 5 has a ring 60 with an L-shaped cross-section which is connected to the first ring 6, a mounting member 61 for a non-shown camera holder which is rotatably arranged in the ring 60 and a fixing member 62 for the mounting member.

The invention claimed is:

1. Mounting apparatus for an optical apparatus, comprising a joint ball, a mounting device for the optical apparatus and a rotationally drivable fixing device for fixing the mounting device to the joint ball, the mounting device comprising two rings that comprise internally threaded portions and which are arranged displaceable to one another, the rings being movable on the joint ball and jointly surround the joint ball, the fixing device being rotationally drivable about the joint ball and disposed between the rings so as to extend directly between the entirety of opposing vertical circumferential surface portions of the rings and comprising threaded portions threadedly connected with the internally threaded portions of the rings so that the rings are movable simultaneously and jointly.

2. Mounting apparatus in accordance with claim 1, wherein the joint ball and the rings consist of a material selected from the group consisting of metal, plastic, and laminated wood.

3. Mounting apparatus in accordance with claim 1, wherein the joint ball is provided with a cut-out.

4. Mounting apparatus in accordance with claim 1, wherein the fixing device comprises a clamping unit comprising a first and a second gear drive, a gear ring for rotating the gear drives and two clamping elements.

5. Mounting apparatus in accordance with claim 1, wherein the fixing device comprises two clamping units and two clamping elements.

6. Mounting apparatus in accordance with claim 1, wherein the fixing device comprises a hydraulic system comprising three pressure cylinders which are arranged between the rings and a control cylinder which communicates with the pressure cylinders via an annular line.

7. Mounting apparatus in accordance with claim 1, wherein the fixing device comprises a vacuum system which includes an annular chamber formed between the rings, a connection passage and a control cylinder.

8. Mounting apparatus in accordance with claim 1, wherein the cut-out comprises a blind bore.

9. Mounting apparatus in accordance with claim 1, further comprising a holder, the holder comprising a pillow block bearing, an axle mounted in the bearing, the axle being connectable to the joint ball, and respective second and third fixing devices for fixing the axle in the pillow block bearing and for fixing the joint ball in the axle.

10. Mounting apparatus for an optical apparatus comprising a joint ball, a mounting device for the optical apparatus and a first fixing device for fixing the mounting device to the joint ball, wherein the mounting device comprises two rings which are arranged displaceable to one another and also movable on the joint ball and jointly surround the joint ball and the fixing device is disposed between the rings and connects them, whereby the rings are movable simultaneously and jointly, and wherein the rings are guided on guides and the fixing device comprises clamping units, each of which comprises a first and a second gear drive which are arranged in a circular array within the rings, and a toothed ring for rotating the gear drives.

11. Mounting apparatus for an optical apparatus comprising a joint ball, a mounting device for the optical apparatus and a fixing device for fixing the mounting device to the joint ball, the mounting device comprising two rings which are arranged displaceable to one another and also movable on the joint ball and jointly surround the joint ball and the fixing device is disposed between the rings and connects them, the rings being movable simultaneously and jointly, and guided on guides disposed within each of the rings, and the fixing device comprises clamping units, each of which comprises a first and a second gear drive which are arranged in a circular array within the rings, and a toothed ring for rotating the gear drives, rotational engagement of the gear drives with the toothed ring being operational to displace the rings relative to one another and to apply a clamping force along the surface of the joint ball.

* * * * *